Dec. 8, 1959 F. W. VAN LUIK, JR 2,915,898
DEVICE FOR DIRECT MEASUREMENT OF RELATIVE HUMIDITY
Filed Nov. 30, 1956 3 Sheets-Sheet 1
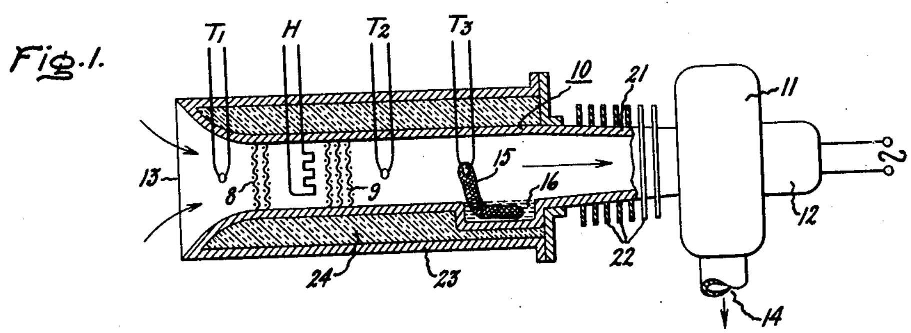
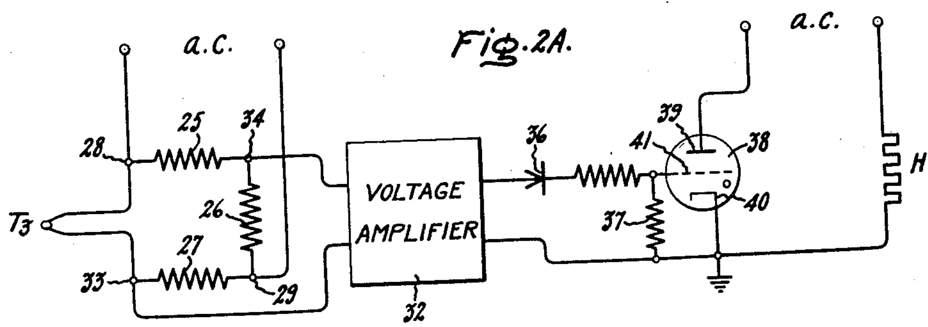
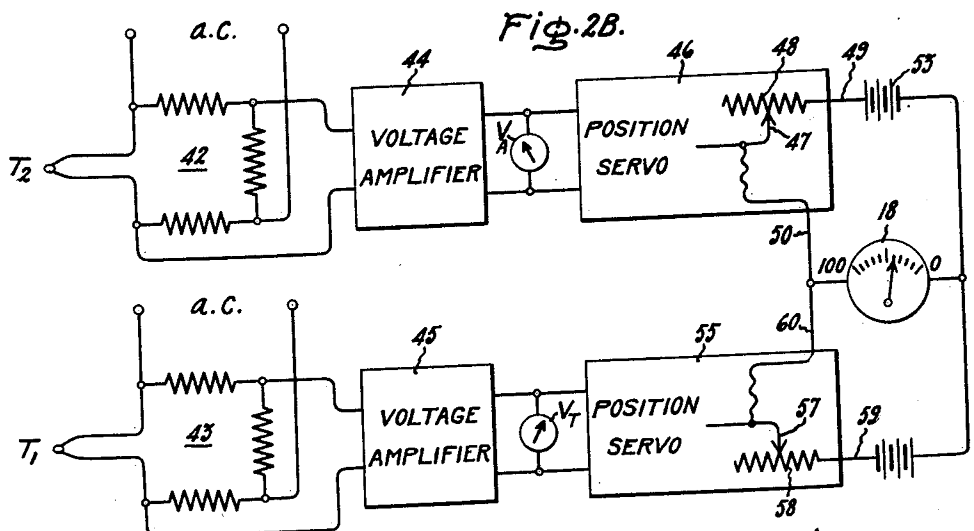
Inventor:
Frank W. VanLuik, Jr.,
by Merton D. Moore
His Attorney.

DEVICE FOR DIRECT MEASUREMENT OF RELATIVE HUMIDITY

Filed Nov. 30, 1956

| $T_1$ | Vp |
|---|---|
| 5 | .0276 |
| 20 | .055 |
| 40 | .12 |
| 60 | .258 |
| 80 | .512 |
| 100 | .97 |

| $T_2$ | Vp |
|---|---|
| 100 | .97 |
| 105 | .94 |
| 110 | .91 |
| 120 | .86 |
| 130 | .79 |
| 140 | .745 |
| 160 | .648 |
| 180 | .535 |
| 200 | .420 |
| 250 | .162 |
| 280 | 0 |

Inventor:
Frank W. Van Luik, Jr.,
by Merton D. Morse
His Attorney.

Dec. 8, 1959 F. W. VAN LUIK, JR 2,915,898

DEVICE FOR DIRECT MEASUREMENT OF RELATIVE HUMIDITY

Filed Nov. 30, 1956 3 Sheets-Sheet 3

Inventor
Frank W. Van Luik, Jr.,
by Merton D Moore
His Attorney

United States Patent Office 2,915,898

Patented Dec. 8, 1959

2,915,898

DEVICE FOR DIRECT MEASUREMENT OF RELATIVE HUMIDITY

Frank W. Van Luik, Jr., Schenectady, N.Y., assignor to General Electric Company, a corporation of New York Application November 30, 1956, Serial No. 625,477

8 Claims. (Cl. 73—338.3)

My invention relates to humidity responsive devices, and it has for one of its objects to provide means to produce a response directly related to, and indicative of, the relative humidity of the atmosphere.

One of the means heretofore utilized for measuring relative humidity of the atmosphere involves the use of the wet bulb thermometer. This may be an ordinary mercury bulb thermometer covered with a wick of moist felt or flannel which is kept constantly moist and from which evaporation occurs at a rate determined by the moisture content of the atmosphere. The evaporation of moisture from the wick about the mercury bulb reduces the temperature of the bulb relative to the temperature of the atmosphere as measured by a similar dry bulb thermometer, to an extent dependent on the vapor pressure in the atmosphere. The relative humidity of the atmosphere may then be determined from these two temperatures by reference to suitable tables or graphs.

An object of my invention is to provide means whereby relative humidity may be directly indicated and which does not require reference to tables or graphs.

A further object of my invention is to provide such a means capable of use over a wide range of temperatures, including temperatures below freezing.

My invention has application, for example, in meteorological stations where the temperatures may range from very low values, including severe sub-zero weather to temperatures of warm summer. Such stations may be unattended or occasionally visited. An object of my invention is to provide means for use in such a station to provide a direct reading indicative of relative humidity and, if desired, to provide a continuous record of relative humidity.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

Figure 1 represents the temperature responsive portion of my invention;

Figure 2A represents a circuit arrangement for maintaining the constant wet bulb temperature;

Figure 2B represents a circuit arrangement for producing a direct indication of relative humidity;

Figure 3:
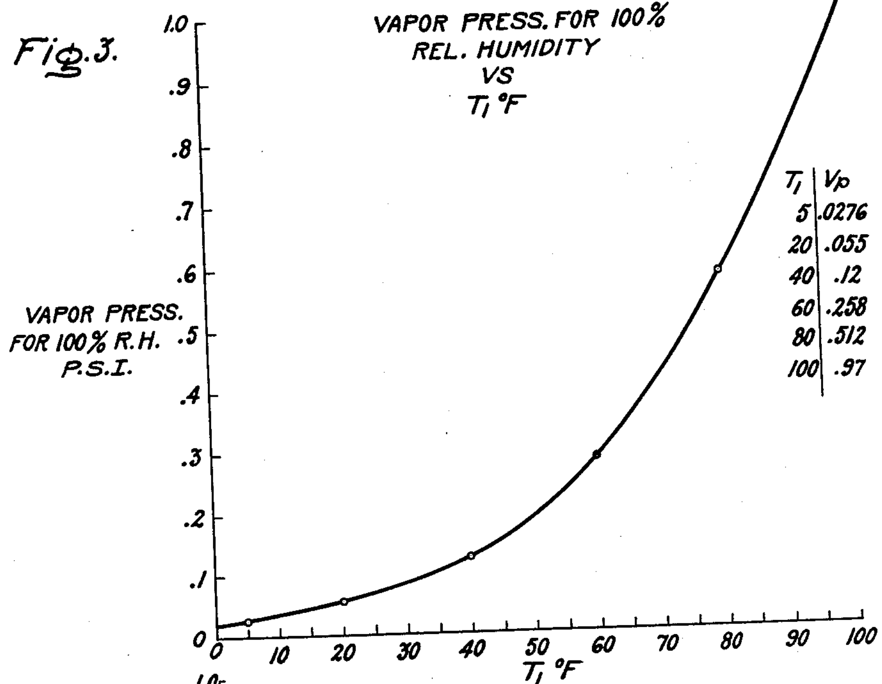
Figure 3 is a conventional characteristic curve expressing the relationship between atmospheric temperature and vapor pressure at saturation or 100% relative humidity.

The terms "wet bulb" and "dry bulb" temperature responsive device, as used herein, are not restricted to any particular type of temperature responsive device, but refer to the condition to which the temperature responsive device is exposed. The term "dry bulb" has reference to a temperature responsive device for measuring temperature of air or gas without artificial means for increasing evaporation about the temperature responsive device itself, whereas the term "wet bulb" has reference to a temperature responsive device provided with means, such as a moist wick, to increase evaporation about the device and depression of the temperature measured to an extent dependent on the vapor pressure of the atmosphere or gas, the relative humidity of which is to be measured.

In accord with my invention, atmospheric air is caused to flow over a wet bulb temperature responsive device and means is provided to heat the air about the wet bulb temperature responsive device sufficiently to maintain the response of the wet bulb temperature responsive device constant, notwithstanding variations in ambient temperature and humidity.

Since relative humidity, by definition, is the ratio of actual vapor pressure present in the atmosphere and the vapor pressure necessary for saturation, means is provided to produce two currents corresponding respectively to these two quantities and having values corresponding to the logarithms of the quantities. These currents are then caused to oppose each other to produce a differential current of value representing relative humidity. This differential current is supplied to a suitable indicating device which may be calibrated in terms of relative humidity.

Referring to Figure 1 of the drawing, I have illustrated therein a conduit 10 having therein a fan 11 which may be operated by a motor 12 to draw air from the ambient atmosphere at 13 through the conduit at a constant rate and to expel it through an outlet 14. At the mouth, or entrance end, 13 of the conduit is arranged a temperature responsive device $T_1$ positioned to measure the dry bulb temperature of the atmosphere entering the conduit. Within the conduit are arranged two additional temperature responsive devices $T_2$ and $T_3$ in that order. The temperature responsive device $T_3$ is provided with a wick 15, a portion of which is immersed in a well of water 16 so that it absorbs the water and evaporates it about the temperature responsive device $T_3$ into the air, or gas, passing through the conduit and thereby, as is normal with wet bulb temperature responsive devices, reduces the temperature to which the temperature responsive device $T_3$ responds relative to the surrounding temperature by an amount dependent upon the actual moisture content or vapor pressure of the gas passing through the conduit.

By means of the circuit presently to be described, and which is illustrated at Figure 2A, heat is supplied to the conduit by means of an electrical heater H sufficient to maintain the temperature indicated by the temperature responsive device $T_3$ constant. On opposite sides of the heater H are properly placed conductive screen material, as indicated at 8 and 9, to render more uniform the temperature across the conduit, otherwise to straighten out the air flow through the conduit, and render it more uniform as to temperature.

Located in the conduit between the heater and the temperature responsive device $T_3$ and at a point where it produces a dry bulb response to gas surrounding the wet bulb device, is the dry bulb temperature responsive device $T_2$. The two temperature responsive devices $T_1$ and $T_2$ are utilized to control the circuit of Figure 2B, presently to be described, to produce the desired indication of the relative humidity on the instrument 18 in Figure 2B.

The temperature responsive devices $T_1$, $T_2$ and $T_3$ may be of any suitable type such, for example, as resistance elements, the resistance of which varies with the temperature. Such temperature responsive devices are sold on the market under the name "Thermistor." They may also comprise thermocouples or other suitable means for producing a desired electrical response to variation in temperature.

Just to the right of the wet bulb temperature responsive device is a section 21 of the conduit adapted for cooling of the air after it has passed the wet bulb thermometer. It may be provided with heat conducting fins 22, or other suitable cooling means, to cool the air after it has passed the temperature responsive device $T_3$. Of course, dependent upon the application in which it is used, this cooling may be sufficient to produce condensation within the conduit of the moisture evaporated from the wick 15 and well 16 whereby this moisture may condense upon the walls of the section and run back into the well to preserve the quantity of moisture present in the well.

The conduit may, if desired, be provided with a housing 23 spaced from and separated from the conduit walls by heat insulation material 24 so that the temperatures within the device are controlled entirely by the heater H and the temperature responsive device $T_3$ connected as shown in Figure 2A.

Figure 2A shows the circuit employed for maintaining constant temperature at the temperature responsive device $T_3$. This device $T_3$ is illustrated as connected in a bridge circuit having arms 25, 26 and 27. Alternating current voltage is applied across diagonally opposite terminals 28 and 29 of the bridge, whereas the input of a voltage amplifier 32 is connected across opposite diagonal terminals 33 and 34 of the bridge. The output from the amplifier is rectified by means of a rectifier 36 to produce a unidirectional voltage across a resistance 37 connected between the grid and cathode of thyratron 38 of polarity to drive the grid positive with respect to the cathode. Alternating voltage of suitable magnitude is represented as connected between the anode 39 of the thyratron 38 and the cathode 40 thereof through a resistance H, which may be the resistance of the heater H shown in Figure 1.

The thyratron 38 is provided with a gas which ionizes only when the anode voltage reaches a certain magnitude, which varies dependent upon the magnitude of the voltage between the grid 41 and cathode 40. That is, during the half cycle when the anode is negative, the thyratron 38 is non-conductive. During the positive half cycle it becomes conducting at a point in the half cycle dependent upon the magnitude of the voltage on the resistance 37. It then remains conducting until the anode voltage is reduced substantially to zero. Thus, the average anode current increases as the grid becomes more positive with respect to the cathode due to unbalance of the bridge.

The constant temperature at which the wet bulb device $T_3$ is maintained may be chosen higher than any temperature to which the atmosphere, the relative humidity of which is to be measured, is likely to be subjected. For example, if the device is to measure the relative humidity of the normal atmosphere of an ordinary living or office space, or of the out-of-doors, the wet bulb temperature responsive device $T_3$ may be maintained at 100° F. The bridge circuit 25, 26, 27, $T_3$ of Figure 2A may then be so adjusted that at 100° F., the resistance of the wet bulb device $T_3$ is such that the bridge is balanced and no voltage appears at the output of the amplifier 32. Thyratron 38 is then non-conducting and heater H is deenergized. When the temperature of $T_3$ reduces, the bridge becomes unbalanced and alternating voltage is supplied to the voltage amplifier where it is amplified, rectified by the rectifier 36, and supplied as a unidirectional potential across resistance 37 of polarity causing ionization of the gas during the positive half cycles of the alternating voltage applied between the anode and the cathode. The resistance H then produces heat in the conduit which raises the temperature of the wet bulb device sufficiently to again balance the bridge. In this way, the temperature of the wet bulb device may be maintained constant at the desired temperature.

Of course, while the wet bulb device $T_3$ indicates a constant temperature of 100° F., for example, the dry bulb device $T_2$ responds to a considerably higher temperature of gas passing the wet bulb device and to a temperature which varies with the ambient vapor pressure. That is, since the wet bulb device responds to a temperature lower than that at $T_2$ by an amount dependent solely on the vapor content of the gas, and since the temperature at which the wet bulb device responds is maintained constant, the temperature $T_2$ must vary solely with vapor pressure. This is true irrespective of ambient temperature variations.

Fig. 2B shows the circuits connected to dry bulb devices $T_1$ and $T_2$. The dry bulb devices $T_1$ and $T_2$ are both connected in bridges 42 and 43, respectively, of the same character as that indicated at 25, 26, 27, $T_3$ in Fig. 2A. The output from each bridge is also connected through voltage amplifiers 44 and 45, respectively. The output from the voltage amplifier 44 may be indicated by a voltmeter $V_a$, the indication of which is proportional to the absolute humidity, or actual vapor pressure of the air passing through the conduit. It is also supplied to a suitable position servo represented by the rectangle 46, which may be a recorder of the type sold on the market by Brown Instrument Company and known as the Brown Recorder. This recorder has a contact 47 which is operated, in accord with the magnitude of the input voltage, over a resistance card, the resistance of which is represented at 48. This resistance card is so constructed that current flowing from the constant voltage source 53 through the resistance between output terminals 49 and 50 has a value which is the logarithm of the input voltage; i.e., of the actual vapor pressure of the air passing through the conduit. Thus, this recorder operates as a converter to convert the voltage supplied to its input, or the corresponding temperature at $T_2$, to a resistance, or current, in its output circuit which varies in accord with the logarithm of the corresponding vapor pressures.

Figure 4:
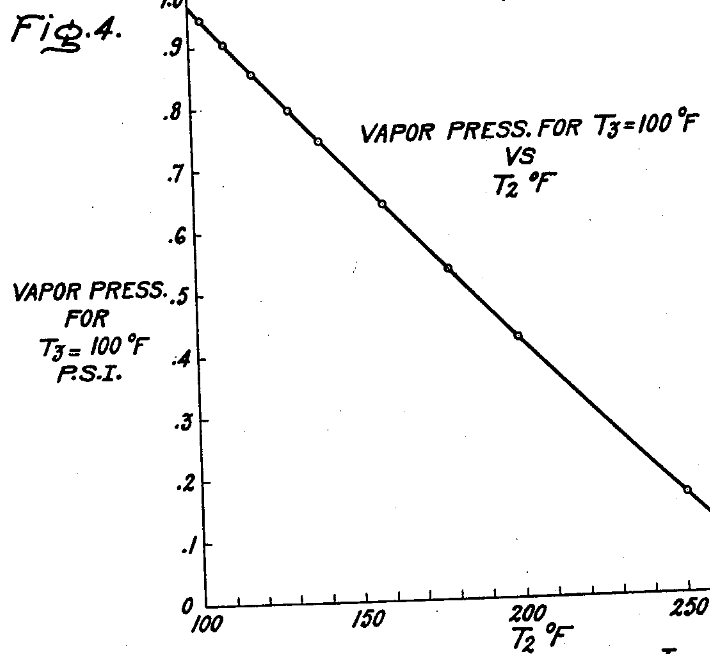
Figure 4 is one of the curves of Figure 5 corresponding to a wet bulb temperature 100° F.

Fig. 4 shows a curve representing the relation between the elevated temperature to which the dry bulb temperature responsive device $T_2$ responds plotted as abscissa against vapor pressure at the constant 100° F. temperature maintained by the circuit of Fig. 2A. This temperature varies with the actual vapor content and the resistance card is so constructed that the current between the output terminals has a value for each temperature plotted as abscissa corresponding to the logarithm of the corresponding vapor pressure plotted as ordinates.

These output terminals 49 and 50 are connected through the source of unidirectional potential 53 across the polarity responsive current indicating device 18.

Figure 5:
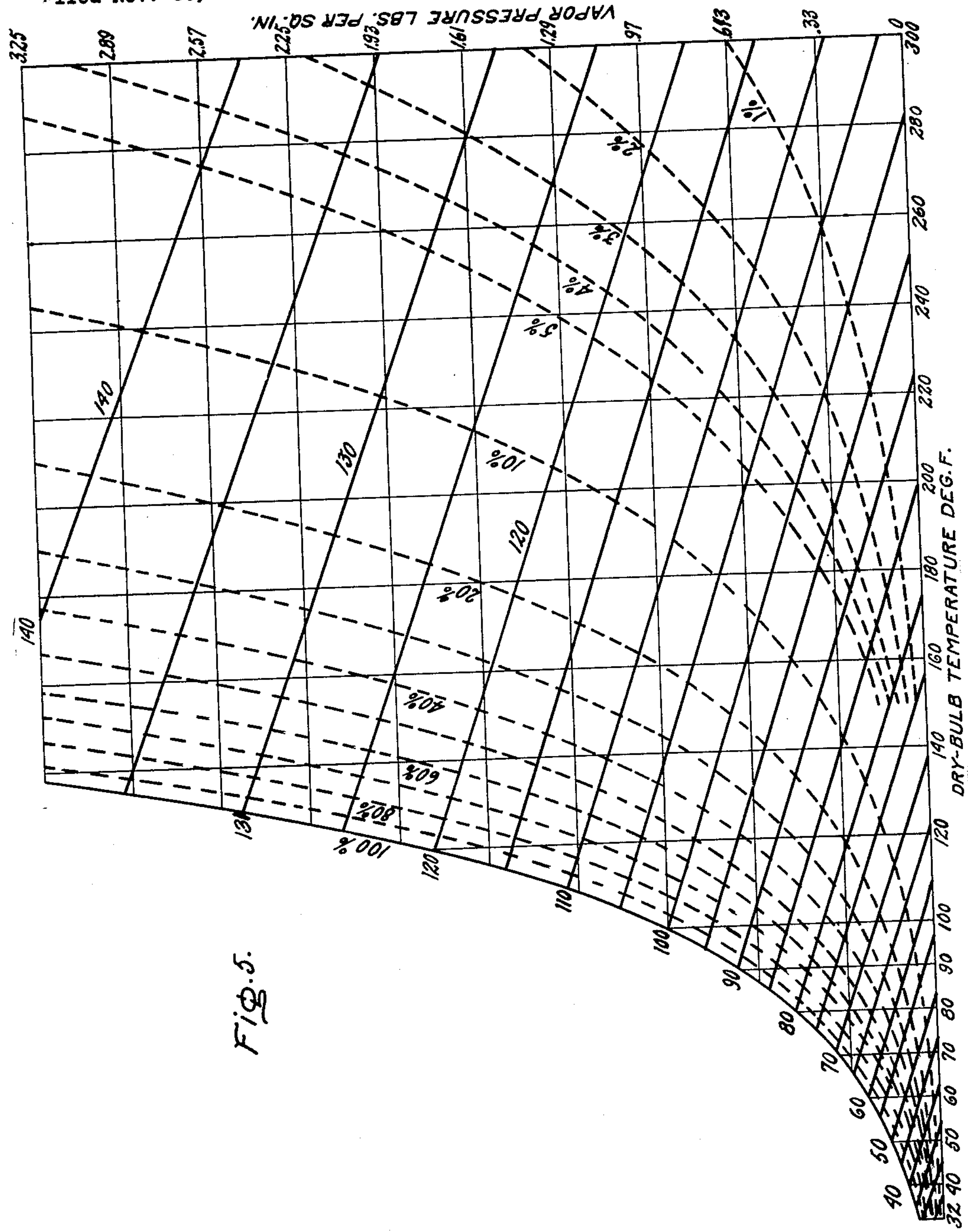
Figure 5 is a standard psychrometric chart.

The curve of Fig 4 is taken directly from the standard psychrometric chart shown in Fig. 5. The pressures plotted as ordinates in Fig. 4 are those pressures plotted as ordinates along the right hand margin of Fig. 5, which pressures correspond to the intersection of vertical lines representing temperatures $T_2$ with the oblique line corresponding to the constant 100° F. wet bulb temperature. The values so obtained are indicated in the two columns at the right hand portion of Fig. 4.

This psychrometric chart is in the usual form comprising vertical lines corresponding to different temperatures which may be taken as the temperatures $T_2$, curved lines representing different degrees of relative humidity, and horizontal lines corresponding to different degrees of vapor pressure. The upper curved line represents the condition of saturation or 100% relative humidity, while the other curved lines represent lower degrees of relative humidity.

The temperature responsive device $T_1$ is also connected through a similar bridge arrangement 43, voltage amplifier 45, and position servo 55 to the polarity responsive current indicating device 18. The voltage supplied to position servo 55, the magnitude of which may be indicated by voltmeter $V_t$, is proportional to ambient temperature. The instrument $V_t$ may be calibrated in terms of ambient temperature. The output of the position servo 55 is connected to the current responsive device 18 in opposite sense to the output of device 46 so that the two currents from the two position servos oppose each other in the instrument 18 with the result that the indication of the instrument is proportional to the difference in the two currents. The position servo 55 is identical with position servo 46 except that the resistance card is constructed to give a resistance change upon change in position of the contact 57 with input voltage which is proportional to the logarithm of the vapor pressure of the air necessary for saturation; i.e., 100% relative humidity. Thus, this position servo, or recorder, acts as a converter to convert the input voltage, or the vapor pressure at which it corresponds, to an output current, or resistance, varying as the logarithm of the vapor pressure necessary to produce saturation of the gas at the respective temperatures.

Fig. 3 shows a curve representing the relation between dry bulb ambient temperature $T_1$ and vapor pressure for 100% relative humidity. This curve corresponds to the full line curve of Fig. 5. The resistance card, the resistance of which is indicated at 58, is so constructed that the current flowing between terminals 59 and 60 for each ambient temperature plotted as abscissa in Fig. 3 has a value corresponding to the logarithm of the corresponding vapor pressure plotted as ordinates in Fig. 3.

Then, since relative humidity is the ratio of actual vapor pressure to the vapor pressure for 100% relative humidity, the difference in the two currents at the output of the position servos is proportional to relative humidity of the atmosphere. The two currents are then passed through current responsive device 18 in opposed relation so that the deflection of the index is proportional to the difference in the two currents. If desired, the instrument may be a polarity responsive device and may be calibrated in terms of relative humidity.

Also, if desired, this instrument may be of the continuously operating recording type to produce a continuous indication with time of the changes in relative humidity of the atmosphere.

While I contemplate my invention's principal usefulness in connection with the measurement of relative humidity of the atmosphere, it will be understood that it also has usefulness in the measurement of the vapor content of other gases, or combinations or mixtures of gases.

While I have shown a particular embodiment of my invention, it will be understood that I do not wish to be limited thereto since various modifications, both in the circuit arrangement and in the instrumentations employed, may be made and I contemplate by the appended claims to cover any such modifications as fall within the true spirit and scope of my invention.

What I claim as new and desire by Letters Patent of the United States is:

1. In a device for measuring relative humidity of the atmosphere, the combination of a wet bulb temperature responsive device, means to pass air from the atmosphere over said wet bulb device, means responsive to said device automatically to heat said air to an elevated temperature sufficient to maintain the wet bulb temperature constant during variations in atmospheric temperatures and vapor pressure, means responsive to the dry bulb temperature of the air at said elevated temperature to produce a current having a magnitude varying as the logarithm of the actual vapor pressure of said air, means responsive to the dry bulb temperature of said atmosphere to produce a current having magnitude varying as the logarithm of the vapor pressure necessary to produce saturation of said atmosphere at said dry bulb temperature, and means responsive to said currents to indicate the relative humidity of said atmosphere.

2. In a device for measuring relative humidity of the atmosphere, the combination of a conduit, means to pass atmospheric air from an area of atmospheric temperature and vapor pressure through said conduit, a wet bulb temperature responsive device in said conduit, means responsive to a decrease in the temperature of said device to supply heat to said conduit at a point upstream from said wet bulb responsive means sufficient to maintain substantially constant temperature response of said wet bulb temperature responsive device, means responsive to the dry bulb temperature of the atmosphere to produce a current varying as the logarithm of the vapor pressure necessary to produce saturation of the atmosphere at the dry bulb temperature to which it responds, means responsive to the dry bulb temperature surrounding the wet bulb temperature responsive device to produce a current varying in magnitude as the logarithm of the absolute vapor pressure of said air, and means indicating relative humidity of the atmosphere from the difference between the magnitudes of said two currents.

3. In a system for determining the vapor content of a gas, the combination of a passage, means to produce a constant flow of said gas through said passage, a temperature responsive device in said passage, means to produce evaporation of moisture about said temperature responsive device sufficient to lower the temperature to which it responds by an amount dependent on the vapor content to be determined, means responsive to said device to elevate the temperature about said temperature responsive means sufficient to maintain said lowered temperature constant during variations in temperature and vapor content of said gas, means responsive to the temperature of said gas in the condition in which its vapor content is to be determined to produce a current varying as the logarithm of the vapor pressure necessary to produce saturation of said gas at said temperature, means responsive to said elevated temperature to produce a current varying as the logarithm of the magnitude of the actual vapor pressure of the gas, and means to indicate the relative humidity of the gas from the difference between said two currents.

4. In combination, an enclosure filled with gas, a temperature responsive device in said enclosure, means to produce evaporation of moisture about said temperature responsive device to depress the temperature to which it responds below the temperature of the gas by an amount dependent upon the moisture content of said gas, means controlled by said temperature responsive device to elevate the temperature of the gas in said enclosure sufficiently to maintain constant the temperature to which said temperature responsive device responds, and means responsive to the temperature of said gas to measure the vapor content thereof.

5. The combination of means to produce a gas stream, a wet bulb temperature responsive device, means controlled thereby to supply heat to the gas stream upstream from the wet bulb device to elevate the temperature of gas reaching the wet bulb device sufficient to maintain the temperature to which the wet bulb device responds constant, and means responsive to said elevated temperature to produce a current proportional to the vapor content of said gas.

6. The combination of means to produce a gas stream, a wet bulb temperature responsive device, means controlled thereby to supply heat to the gas stream upstream from the wet bulb device to elevate the temperature of gas reaching the wet bulb device sufficient to maintain the temperature to which the wet bulb device responds constant, means responsive to said elevated temperature to produce a current proportional to the vapor content of said gas, and means responsive to said current and to the temperature of said gas upstream from said heat supply means to indicate the relative humidity of said gas.

7. The combination of means to produce a gas stream, a wet bulb temperature responsive device in said gas stream, means controlled by said wet bulb device to supply heat to the stream upstream from the wet bulb device to elevate the temperature of gas reaching the wet bulb device sufficiently to maintain constant the temperature to which the wet bulb device responds, means responsive to said elevated temperature to produce a current having a value corresponding to the logarithm of the absolute humidity of said gas, means responsive to the temperature of said gas upstream from said heat supply means to produce a current having a value corresponding to the logarithm of the vapor pressure of said gas necessary for saturation of the gas, and means responsive to the difference in said currents to indicate the relative humidity of said gas.

8. The combination, in a device for measuring relative humidity of a gas under varying conditions of temperature and vapor pressure, a pair of converters each including an input circuit and an output circuit, said output circuits each including a resistance element and a contact variable in position along the length of the resistance element, means to vary the position of one of said contacts along its resistance element in response to and in accord with the temperature of said gas at the temperature at which relative humidity is to be measured, means to vary the position of the other of said contacts in accord with the actual vapor content of said gas, the resistance element associated with said one contact having resistance which varies upon movement of the respective contact as the logarithm of vapor pressure required to produce saturation of the gas at the temperature corresponding to the position of the respective contact, said other resistance element having resistance which varies upon movement of its respective contact in accord with the logarithm of the vapor pressure corresponding to the position of the respective contact, and means connected in said output circuits and controlled by said resistances to indicate the relative humidity of said gas.

References Cited in the file of this patent

UNITED STATES PATENTS

| | | |
|---|---|---|
| 1,601,243 | Irwin | Sept. 28, 1926 |
| 2,600,396 | Ewen | June 17, 1952 |
| 2,691,123 | Schuck | Oct. 5, 1954 |